(12) United States Patent
Kannan et al.

(10) Patent No.: US 7,582,693 B2
(45) Date of Patent: Sep. 1, 2009

(54) COMPOSITION AND METHOD FOR ENHANCING THE WELD STRENGTH OF POLYPHENYLENE ETHER COMPOSITIONS

(75) Inventors: Ganesh Kannan, Bangalore (IN); Vijay Mhetar, Slingerlands, NY (US)

(73) Assignee: Sabic Innovative Plastics IP B.V. (NL)

( * ) Notice: Subject to any disclaimer, the term of this patent is extended or adjusted under 35 U.S.C. 154(b) by 172 days.

(21) Appl. No.: 10/421,601

(22) Filed: Apr. 22, 2003

(65) Prior Publication Data

US 2004/0214960 A1    Oct. 28, 2004

(51) Int. Cl.
| | |
|---|---|
| B32B 7/12 | (2006.01) |
| B60C 1/00 | (2006.01) |
| C08F 16/12 | (2006.01) |
| C08F 116/12 | (2006.01) |
| C08F 216/12 | (2006.01) |
| C08G 59/50 | (2006.01) |
| C08K 5/00 | (2006.01) |
| C08K 5/16 | (2006.01) |
| C09D 11/02 | (2006.01) |

(52) U.S. Cl. .................. 524/186; 524/236; 524/243; 524/251; 524/252; 525/328.9

(58) Field of Classification Search ............. 525/328.9; 524/186, 236, 243, 251, 252
See application file for complete search history.

(56) References Cited

U.S. PATENT DOCUMENTS

| | | | | |
|---|---|---|---|---|
| 2,182,306 | A | 12/1939 | Ulrich et al. | .................... 260/2 |
| 2,208,095 | A | 7/1940 | Esselmann et al. | ............. 260/2 |
| 2,553,696 | A | 5/1951 | Wilson et al. | ............... 260/239 |
| 2,792,372 | A | 5/1957 | Dickson et al. | ............. 252/344 |
| 2,806,839 | A | 9/1957 | Crowther et al. | ........... 260/77.5 |
| 3,033,746 | A | 5/1962 | Moyle et al. | ................... 167/31 |
| 3,887,647 | A * | 6/1975 | Yonemitsu et al. | .......... 524/112 |
| 4,123,474 | A | 10/1978 | Katchman | |
| 4,368,293 | A | 1/1983 | Yamashita et al. | |
| 4,386,176 | A | 5/1983 | Fukuda et al. | |
| 4,410,651 | A | 10/1983 | Haaf et al. | |
| 4,442,251 | A | 4/1984 | Haaf et al. | |
| 4,454,284 | A | 6/1984 | Ueno et al. | |
| 4,665,112 | A | 5/1987 | Berdahl | |
| 4,844,320 | A | 7/1989 | Stokes | |
| 4,863,984 | A | 9/1989 | Yeager et al. | |
| 4,871,800 | A | 10/1989 | Fujii et al. | |
| 4,892,904 | A | 1/1990 | Ting | |
| 4,914,153 | A | 4/1990 | Togo et al. | |
| 4,970,272 | A * | 11/1990 | Gallucci | ..................... 525/397 |
| 5,296,540 | A | 3/1994 | Akiyama et al. | |
| 5,370,813 | A | 12/1994 | DeNicola, Jr. et al. | |
| 5,756,196 | A | 5/1998 | Chao et al. | |
| 6,031,049 | A | 2/2000 | Chino et al. | |
| 6,147,161 | A | 11/2000 | Chao | |
| 6,303,216 | B1 | 10/2001 | Chao et al. | |
| 6,350,514 | B1 | 2/2002 | Venderbosch | |
| 6,365,665 | B1 | 4/2002 | Chao et al. | |

FOREIGN PATENT DOCUMENTS

| | | |
|---|---|---|
| EP | 0800871 | 6/1989 |
| EP | 0 448 341 A1 | 3/1991 |
| EP | 0 493 674 B1 | 11/1991 |
| EP | 0 605 195 A2 | 12/1993 |
| EP | 0 751 185 A2 | 6/1996 |
| EP | 0849329 | 12/1997 |

OTHER PUBLICATIONS

O.D. Dermer, G.E. Ham "Ethyleimine and Other Aziridines" Academic Press NY (1969).
D. Horn, "Polymeric Amines and Ammonium Salts" $1^{st}$ Edn pp. 333-355, EJ Goethals Ed., Pergamon Press, Oxford and NY (1980).
http://www.shinwoochem.com/english/product/epomin_intro.asp.
http://www.shinwoochem.com/english/product/epomin_reactivity.asp.
http://www.shinwoochem.com/english/product/epomin_specification.asp.
http://www.shinwoochem.com/english/product/epomin_products.asp.
http://www.shinwoochem.com/english/product/epomin_industrial.asp.
http://www.polymerenterprises.com/prod03.htm.
http://www.polymerenterprises.com/prod02.htm.
http://www.polymerenterprises.com.

(Continued)

*Primary Examiner*—Patrick D Niland
(74) *Attorney, Agent, or Firm*—Cantor Colburn LLP

(57) ABSTRACT

The present invention provides a welded article having improved weld line strength, said article comprising a resin composition wherein said resin composition comprises at least one polyphenylene ether, at least one poly(alkenylaromatic) compound and at least one polyalkyleneimine. In a preferred embodiment, the welded article has been manufactured using at least one of ultrasonic welding and vibration welding, e.g., linear friction welding and spin friction welding. In another preferred embodiment, the welded article has a peak weld line stress of at least 800 psi, preferably of at least 1000 psi.

8 Claims, No Drawings

OTHER PUBLICATIONS http://www.polymerenterprises.com/prod01.htm.
http://www.polymerenterprises.com/serv01.htm.
JP04239558. Publication Date: Aug. 27, 1992. "Stabilized Resin Composition". (Abstract Only).
International Search Report Dated Nov. 25, 2004.
D. Horn, "Polymeric Amines and Ammonium Salts" 1st Edn pp. 333-355, EJ Goethals Ed., Pergamon Press, Oxford and NY (1980).
Japanese Patent No. 1992239558, published Aug. 27, 1992. Machine Translation.

* cited by examiner

COMPOSITION AND METHOD FOR ENHANCING THE WELD STRENGTH OF POLYPHENYLENE ETHER COMPOSITIONS

BACKGROUND OF THE INVENTION

Polyphenylene ether resins generally show outstanding mechanical properties, thermal resistance, electrical characteristics, and flame resistance, and are commonly used in a broad range of applications, such as components in automobiles. In particular, various components in automobiles such as internal components, for example, instrument panels and arm rests as well as underhood components, for example, resonators and air intake components. Many of these components require a high degree of thermal resistance making polyphenylene ether resin compositions ideally suited for such applications; however, many of these same components are manufactured in multiple pieces and require assembly involving adhesives, ultrasonic welding and/or frictional welding techniques. Adhesives often have disadvantages such as cure times, storage, handling, and chemical smell concerns. Welding techniques are often preferred but failures at the weld due to repeated, long term vibration and impacts over the life of the vehicle are a serious concern. Therefore, compositions and methods that enhance welding techniques remain highly desirable.

SUMMARY OF THE INVENTION

The present invention provides a welded article having improved weld line strength, said article comprising a resin composition wherein said resin composition comprises at least one polyphenylene ether, at least one poly(alkenylaromatic) compound and at least one weld line strength promoter, preferably a polyalkyleneimine. In a preferred embodiment, the welded article has been manufactured using at least one of ultrasonic welding and vibration welding, e.g., linear friction welding and spin friction welding. In another preferred embodiment, the welded article has a weld line stress of at least 800 psi, preferably of at least 1000 psi.

Another embodiment of the invention is to provide a method for welding a thermoplastic substrate comprising at least one polyphenylene ether, at least one poly(alkenylaromatic) compound, and at least one weld line strength promoter; wherein said method yields a weld line strength of at least about 800 psi. In one embodiment, the welding involves at least one of ultrasonic welding and vibration welding. In accordance with this invention, there is provided a thermoplastic article of manufacture that has peak weld line stress of at least 800 psi, preferably of at least 1000 psi. and is useful as an automotive component.

Another embodiment of the invention is to provide a composition that affords articles having improved weld line strength after welding article components with at least one of ultrasonic welding and vibration welding, wherein the composition comprises a thermoplastic resin, said thermoplastic resin comprising at least one polyphenylene ether, at least one poly(alkenylaromatic) compound and at least one polyalkyleneimine

DETAILED DESCRIPTION OF THE INVENTION

The inventors have found that the principal components of the inventive composition that will yield an article having enhanced weld line strength are: a thermoplastic mixture or blend of at least one polyphenylene ether, at least one poly(alkenylaromatic) compound and at least one weld strength promoter, preferably a polyethyleneimine. Other components can be present in the composition such as flame retardants, impact modifiers, mold releases, antioxidants, stabilizers, fillers, and mixtures thereof.

Representative examples of polyphenylene ethers are known polymers comprising a plurality of structural units of the formula:

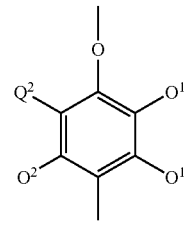

wherein in each of said units independently, each $Q^1$, is independently halogen, primary or secondary lower alkyl (i.e. alkyl containing up to seven carbon atoms), phenyl, haloalkyl, aminoalkyl, hydrocarbonoxy, or halohydrocarbonoxy, wherein at least two carbon atoms separate the halogen and the oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$-alkyl, and each $Q^2$ is hydrogen.

Both homopolymer and copolymer polyphenylene ethers are included. The preferred homopolymers are those containing 2,6-dimethyl-1,4-phenylene ether units. Suitable copolymers include random copolymers containing such units in combination with, for example, 2,3,6-trimethyl-1,4-phenylene ether units. Also included are polyphenylene ethers containing moieties prepared by grafting onto the polyphenylene ether in known manner such materials as vinyl monomers or polymers such as polystyrenes and elastomers, as well as coupled polyphenylene ethers in which coupling agents such as low molecular weight polycarbonates, quinones, heterocycles and formals, undergo reaction in known manner with the hydroxy groups of polyphenylene ether chains to produce a higher molecular weight polymer.

The polyphenylene ether resins generally have a number average molecular weight in a range between about 3,000 and 40,000 in one embodiment of the present invention. Useful polyphenylene ether resins generally have an intrinsic viscosity (hereinafter referred to sometimes as "i.v.") in the range between about 0.15 and about 0.6 deciliters/gram (dl/g), as measured in chloroform at 25° C.

The polyphenylene ethers may be typically prepared by the oxidative coupling of at least one monohydroxyaromatic compound such as 2,6-xylenol or 2,3,6-trimethylphenol. Catalyst systems are generally employed for such coupling and they typically contain at least one heavy metal compound such as copper, manganese, or cobalt compound, usually in combination with various other materials.

Particularly useful polyphenylene ethers for many purposes are those that comprise molecules having at least one aminoalkyl-containing end group. The aminoalkyl radical is typically located in an ortho position to the hydroxy group. Products containing such end groups may be obtained by incorporating an appropriate acid containing copolymer as one of the constituents of the oxidative coupling reaction mixture. Also frequently present are 4-hydroxybiphenyl end groups, typically obtained from reaction mixtures in which a by-product diphenoquinone is present. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the polyphenylene ethers contemplated for use in the present invention include all those presently known, irrespective of variations in structural units or ancillary chemical features.

The poly(alkenylaromatic) compounds employed in the thermoplastic resinous substrate composition include homopolymers and copolymers of such compounds as styrene, alpha.-methylstyrene, 4-methylstyrene and dibromostyrene. Polystyrene may be used in some embodiments. In many embodiments conventional rubber-modified polystyrenes, sometimes designated "high impact polystyrene" or "HIPS" may be used.

While polyphenylene ether and poly(alkenylaromatic) compound blends containing any proportion of the two resins may be employed, in some embodiments, the polyphenylene ether may be present in amounts of at least about 20% by weight based on the combined weight of the two polymers, preferably between about 20 and 80% by weight based on the total weight of the polyphenylene ether and poly(alkenylaromatic) compound materials. In one embodiment the amount of polyphenylene ether in the polyphenylene ether-poly(alkylene aromatic) compound blend may be in a range between about 20% by weight and about 60% by weight based on the total weight of these two polymeric materials.

The polyphenylene ether and poly(alkenylaromatic) compound mixture or blend may also contain conventional additives, especially flame retardant additives and impact modifiers. Flame retardant additives include brominated polystyrenes and phosphorus-containing chemicals such as triphenylphosphate, tri-t-butylphenylphosphate, tetraphenyl resorcinol bisphosphate, tetraxylyl resorcinol bisphosphate, tetraphenylhydroquinone bisphosphate and tetraxylyl hydroquinone bisphosphate.

Impact modifiers for polyphenylene ether-poly(alkenylaromatic) compound mixtures or blends known in the art may also be employed. They include diblock and triblock copolymers of alkenylaromatic compounds such as styrene and aliphatic dienes such as butadiene and isoprene. The diene-derived blocks in said copolymers may be substantially saturated or may possess substantial unsaturation. One or more impact modifiers can be used.

As noted the principal ingredient of the invention is the weld strength promoter. The weld strength promoter may be an amine containing compound with at least an NH group while in a preferred embodiment the weld strength promoter may be a amine compound with at least an $NH_2$ group and in a more preferred embodiment the weld strength promoter may be an amine compound with a combination of NH groups and $NH_2$ groups. The amount of weld strength promoter used in the compositions of the present invention can vary depending on the effectiveness of the particular weld strength promoter to achieve the desired weld line strength. In a preferred embodiment, the amount of weld strength promoter used in the compositions of the present invention is an amount effective to achieve adhesion of the composition to polyurethane foam. Generally, the level of weld strength promoter is in the range between about 0.5 weight percent and about 25 weight percent based on the combined weight of the polyphenylene ether and poly(alkenylaromatic) resins, more preferably in the range between about 1 weight percent and about 15 weight percent and even more preferably in the range between about 1 weight percent and about 12 weight percent based on the combined weight of the polyphenylene ether and poly(alkenylaromatic) compound.

The weld line strength promoters of the present invention comprise:

i) polyamines having a backbone of the formula:

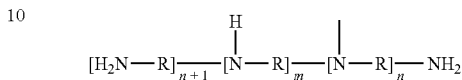

wherein R is $C_{.2}$-$C_{.8}$ alkylene, $C_{.3}$-$C_{.8}$ alkyl substituted alkylene, and mixtures thereof and wherein m is from 2 to about 700; n is from 0 to about 350;

ii) polyamines having a backbone of the formula:

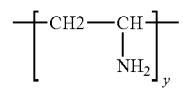

wherein y is from 5 to 10,000 and (iii) polyamine compounds wherein from 0% to 100% of the polyamine backbone NH units are substituted by one or more units having the formula:

wherein $R^1$ is $C_2$-$C_6$ alkylene, $C_3$-$C_6$ alkyl substituted alkylene, and mixtures thereof; $R^2$ is hydrogen, $C_{.1}$-$C_{.4}$ alkyl, and mixtures thereof; and wherein x is from 1 to 12.

In some embodiments, polyamines of the present invention comprise backbones wherein less than 50% of the R groups comprise more than 3 carbon atoms. The use of two and three carbon spacers as R moieties between nitrogen atoms in the backbone is advantageous for controlling the vibration weld adhesion enhancement properties of the molecules. More preferred embodiments of the present invention comprise less than 25% moieties having more than 3 carbon atoms. Yet more preferred backbones comprise less than 10% moieties having more than 3 carbon atoms. Most preferred backbones comprise 100% ethylene moieties.

The weld line strength enhancing polyamines of the present invention comprise homogeneous or non-homogeneous polyamines backbones, preferably homogeneous backbones. For the purpose of the present invention the term "homogeneous polyamine backbone" is defined as a polyamine backbone having R units that are the same, (e.g., all ethylene). However, this definition does not exclude polyamines that comprise other extraneous units comprising the polymer backbone that are present due to an artifact of the chosen method of chemical synthesis. For example, it is known to those skilled in the art that ethanolamine may be used as an "initiator" in the synthesis of polyethyleneimines, therefore a sample of polyethyleneimine that contains one hydroxyethyl moiety resulting from the polymerization "initiator" would be considered to comprise a homogeneous polyalkyleneimine backbone for the purposes of the present invention.

For the purposes of the present invention the term "non-homogeneous polymer backbone" refers to polyamine backbones that are a composite of one or more alkylene or substituted alkylene moieties, for example, ethylene and 1,2-propylene units taken together as R units.

However, not all of the weld line enhancing agents belonging to this category of polyamines comprise the above described polyalkyleneimines. Other polyamines that comprise the backbone of the compounds of the present invention are generally polyalkyleneamines (PAA's), polyalkyleneimines (PAI's), preferably polyethyleneamine (PEA's), or polyethyleneimines (PEI's). A common polyalkyleneamine (PAA) is tetrabutylenepentamine. PEA's are obtained by reactions involving ammonia and ethylene dichloride, followed by fractional distillation. The common PEA's obtained are triethylenetetramine (TETA) and tetraethylenepentamine (TEPA). Above the pentamines, i.e., the hexamines, heptamines, octamines and possibly nonamines, the cogenerically derived mixture does not appear to separate by distillation and can include other materials such as cyclic amines and particularly piperazines. There can also be present cyclic amines with side chains in which nitrogen atoms appear. See U.S. Pat. No. 2,792,372, Dickinson, issued May 14, 1957, which describes the preparation of PEA's.

The PEI's which comprise the preferred backbones of the polyamines of the present invention can be prepared, for example, by polymerizing ethyleneimine in the presence of a catalyst such as carbon dioxide, sodium bisulfite, sulfuric acid, hydrogen peroxide, hydrochloric acid, acetic acid, etc. Specific methods for preparing PEI's are disclosed in U.S. Pat. No. 2,182,306, Ulrich et al., issued Dec. 5, 1939; U.S. Pat. No. 3,033,746, Mayle et al., issued May 8, 1962; U.S. Pat. No. 2,208,095, Esselmann et al., issued Jul. 16, 1940; U.S. Pat. No. 2,806,839, Crowther, issued Sep. 17, 1957; and U.S. Pat. No. 2,553,696, Wilson, issued May 21, 1951. In addition to the linear and branched PEI's, the present invention also includes the cyclic amines that are typically formed as artifacts of synthesis. The presence of these materials may be increased or decreased depending on the conditions chosen by the formulator.

In some embodiments the weld line strength promoter may comprise cyclohexylamine, 1-hexadecylamine, a triamine having the formula:

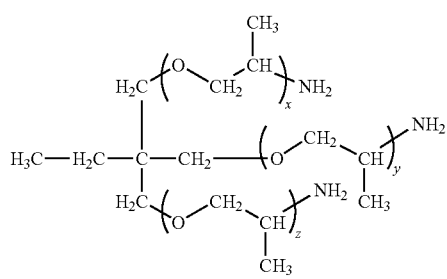

wherein the sum of x+y+z is from about 3 to about 20; N,N-diethylamine, N,N-dipropylamine, a polyethyleneimine having the formula

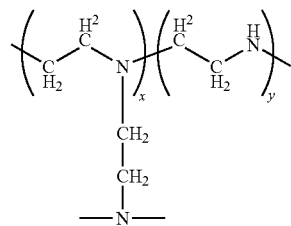

wherein "x" and "y" are integers each having a value from about 2 to about 15; and a polyethyleneimine of the formula:

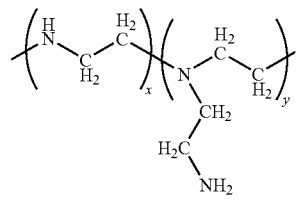

wherein the ratio of x:y is about 3:4; or mixtures thereof. The number average molecular weight of the polyethyleneimines of the present invention may vary in a range between about 100 and about 10,000 and in a preferred embodiment in a range between about 500 and about 5,000.

Vibration welding, also known as friction welding, involves the rubbing of two thermoplastic parts together, under pressure and at a suitable frequency and amplitude, until enough heat is generated to melt and mix the polymer at the interface. After vibration is stopped, the parts are aligned and the molten polymer allowed to solidify, creating the weld (also known as the "weld line"). Spin welding and linear friction welding are similar except that in spin welding, the motion is rotational and in linear friction welding the motion is linear rather than rotational.

Vibration weld parameters may be set by trial and error. Once a pressure and frequency have been selected, each weld is accomplished by performing the vibration for a predetermined time that is found to be satisfactory. The time parameter when used as the variable for terminating the weld process is sensitive to part uniformity and slight variations in pressure. Minor variations in part geometry can result in significant changes in the weld time required for a quality weld. Welding may be conducted at a frequency in the range between about 10 Hz and about 1000 Hz, while in a preferred embodiment, the welding may be conducted at a frequency in the range between about 50 Hz and about 500 Hz. In one embodiment of the invention, welding may be conducted at a pressure in the range between about 10 psi and about 1000 psi while in a preferred embodiment of the invention, welding may be conducted at a pressure in the range between about 50 psi and about 500 psi.

Ultrasonic welding involves the use of high frequency sound energy to soften or melt the thermoplastic at the joint. Parts to be joined are held together under pressure and are then subjected to ultrasonic vibrations usually at a frequency of 20, 30, or 40 kHz. The ability to weld a component successfully is governed by the design of the equipment, the mechanical properties of the material to be welded and the design of the components, all of which are commonly known in the art.

Using the weld methods and the weld line promoters of the present invention, welded articles may be made that have adhesion qualities that may not be achieved with adhesives. Often adhesion is substrate dependent and adhesives may not bond substrates that do not have sufficient polarity. Bonding plastics using adhesives may require the use of solvents or even elevated temperatures, the use of which may not be possible. The weld method and the weld line promoters of the present invention overcome such problems. Non-limiting examples of articles that utilize the weld method of the present invention include business machine housings auto components, aircraft and spacecraft interiors, building interiors, home appliances and other articles that require strength of bonding. These articles may be made on a production line or a manufacturing facility.

The compositions of the present invention are prepared by mechanically blending the components in conventional mixing equipment, e.g., a single or twin screw extruder, Banbury mixer, or any other conventional melt compounding equipment. A vacuum may also be applied to during the compounding operation to further reduce odorous materials from the composition. The order in which the components of the composition are mixed is not generally critical and may be readily determined by one of skill in this art.

Further understanding of the present invention may be had from the following examples and comparative examples which are intended to illustrate, but not limit, the invention. All cited references are hereby incorporated herein in their entirety.

EXAMPLES

To test the weld line strength properties of various resin compositions of polyphenylene ether resin, poly(alkenylaromatic) compound with primary amine or secondary amine containing materials, various test formulations were obtained as detailed in Table 1 below and tested via vibration welding.

Vibration Weld Method:

Welding parameters were set on machine using an auto menu for Table Height. Parameters menu was used for welding parameters and weld parameters were set at the following values: amplitudes 0.08-0.16", weld force: 400 lb.

Weld Method were set as: Weld by meltdown for "T" geometry testing one 3"×6" plaque was placed in the lower mount with the as-molded edge facing upward. The second sample was loaded into the top fixture. Two inch by six inch plaques were welded in a "butt" geometry by using the appropriate fixture. The welding was performed from the auto screen once table height had been set and weld parameters were as desired. Once the plaque had been welded, the sample was removed and labeled. Weld parameters including amplitude, weld force and melt down were recorded. The sample was then cut on a bandsaw into 1" wide pieces. The ends were discarded. Some or all of the remaining pieces were pulled on a universal testing machine.

Weld-Strength:

Example 1-7

Seven compositions containing polyphenylene ether and poly(alkenylaromatic compound) were made and tested for vibration weld strength. Table 1 shows the compositions in samples 1-7 along with the results from vibration weld testing. Sample 1 represents control formulation without any weld strength promoter additive. The control composition sample 1 contains poly(2,6-dimethyl-1,4-phenylene oxide) (PPE), HIPS (high-impact polystyrene), and KG1651 saturated triblock impact modifier (S-EB-S) from Kraton Polymers. This material had poor vibration weld strength. Samples 2-7 containing amine based weld strength promoters in the compositions show substantial peak stress values and indicate good vibration weld strength of poly(2,6-dimethyl-1,4-phenylene oxide) high impact polystyrene and KG1651 saturated triblock impact modifier (S-EB-S) compositions.

TABLE 1

|  | Sample: | | | | | | | | |
| --- | --- | --- | --- | --- | --- | --- | --- | --- | --- |
|  | 1 | 2 | 3 | 4 | 5 | 6 | 7 | 8 | 9 |
| PPE (0.40 Intrinsic Viscosity)[1] | 40 | 40 | 40 | 40 | 40 | 40 | 40 | 40 | 40 |
| HIPS[2] | 50 | 50 | 50 | 50 | 50 | 50 | 50 | 50 | 50 |
| KG1651[3] | 10 | 10 | 10 | 10 | 10 | 10 | 10 | 10 | 10 |
| Epomin SP-200[4] | 0 | 2 | 4 | 8 | | | | | |
| Epomin SP-12[4] | 0 | | | | 2 | 4 | 8 | | |
| Jeffamine T-403[5] | | | | | | | | 2 | 8 |
| Peak stress psi[6] | 755 | 1312 | 2143 | 2981 | 1112 | 1963 | 2486 | 803 | 1055 |

[1]PPE (0.40 intrinsic viscosity): polyphenylene ether
[2]HIPS: high-impact polystyrene
[3]Kraton KG1651: S-EB-S copolymer
[4]Polyethyleneimine (Nippon Shokubai Co.)
[5]Polyoxypropylenetriamine from Huntsman
[6]Measured in p.s.i.

As exemplified by the above data, addition of relatively low levels of polyalkyleneimine resulted in an unexpected increase in weld line strength, especially when compared to a polyoxypropylenetriamine as exemplified in samples 8 and 9. The large increase in weld line strength, represented as peak stress, for the polyalkyleneimines as compared to the polyetheramines of sample 8 and 9 was not have been expected. Thus, in some preferred embodiments of the invention, weld line strength is increased by at least 1.25 times, preferably by at least 1.4 times, as compared to a composition not containing a weld line promoter.

What is claimed is:

1. A resin composition consisting of at least one polyphenylene ether, at least one poly(alkenylaromatic) compound, at least one weld line strength promoter, and at least one component selected from the group consisting of flame retardants, impact modifiers, mold releases, antioxidants, stabilizers, fillers, and mixtures thereof, wherein the weld line strength promoter is selected from the group consisting of:
cyclohexylamine, 1-hexadecylamine, a triamine having the formula:

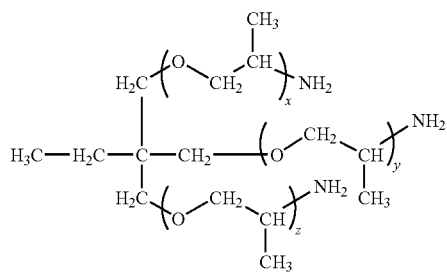

wherein the sum of x+y+z is from about 3 to about 20; N,N-diethylamine, N,N-dipropylamine, a polyethyleneimine having the formula:

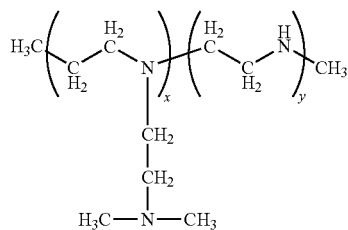

wherein "x" and "y" are integers each having a value from about 2 to about 15,
a polyamine having a backbone of the formula

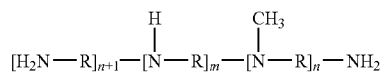

wherein R is $C_2$-$C_8$ alkylene, $C_3$-$C_8$ alkyl substituted alkylene, and mixtures thereof, wherein m is from 2 to about 700; n is from 0 to about 350,
a polyamine having a backbone of the formula:

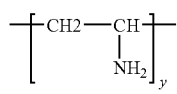

wherein y is from 5 to about 10,000;
polyamine compounds wherein from 0% to 100% of the polyamine backbone NH units are substituted by one or more units having the formula:

wherein $R^1$ is $C_2$-$C_6$ alkylene, $C_3$-$C_6$ alkyl substituted alkylene, and mixtures thereof; $R^2$ is hydrogen, $C_1$-$C_4$ alkyl, and mixtures thereof, and x is from 1 to 12 and y is from 5 to 5000;
a polyethyleneimine, and combinations of two or more of the foregoing weld line strength promoters.

2. A resin composition consisting of at least one polyphenylene ether, at least one poly(alkenylaromatic) compound, an amount of one or more weld line strength promoters, and an additional component selected from the group consisting of flame retardants, impact modifiers, mold releases, antioxidants, stabilizers, fillers, and mixtures thereof, wherein the weld line strength promoter is selected from the group consisting of cyclohexylamine, 1-hexadecylamine, a triamine having the formula:

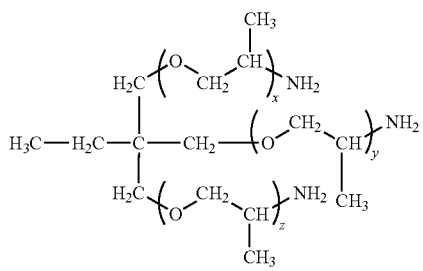

wherein the sum of x+y+z is from about 3 to about 20; N,N-diethylamine, N,N-dipropylamine, a polyethyleneimine having the formula:

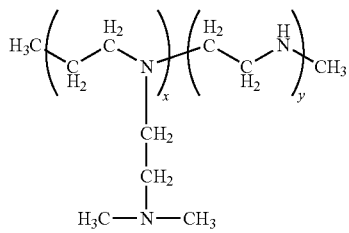

wherein "x" and "y" are integers each having a value from about 2 to about 15 and mixtures thereof, and combinations of two or more of the foregoing weld line strength promoters.

3. A resin composition consisting of at least one polyphenylene ether, at least one poly(alkenylaromatic) compound, an amount of at least one weld line strength promoter, and an additional component selected from the group consisting of flame retardants, impact modifiers, mold releases, antioxidants, stabilizers, fillers, and mixtures thereof, wherein the weld line strength promoter is selected from the group consisting of
i) a polyamine having a backbone of the formula

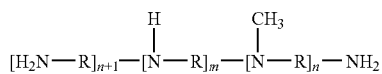

wherein R is $C_2$-$C_8$ alkylene, $C_3$-$C_8$ alkyl substituted alkylene, and mixtures thereof, wherein m is from 2 to about 700; n is from 0 to about 350,
ii) a polyamine having a backbone of the formula:

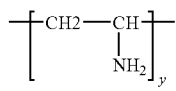

wherein y is from 5 to about 10,000;
iii) polyamine compounds wherein from 0% to 100% of the polyamine backbone NH units are substituted by one or more units having the formula:

wherein $R^1$ is $C_2$-$C_6$ alkylene, $C_3$-$C_6$ alkyl substituted alkylene, and mixtures thereof; $R^2$ is hydrogen, $C_1$-$C_4$ alkyl, and mixtures thereof, and x is from 1 to 12 and y is from 5 to 5000;

iv) a polyethyleneimine, and combinations of two or more of the foregoing weld line strength promoters.

4. A resin composition consisting of at least one polyphenylene ether, at least one poly(alkenylaromatic) compound, at least one impact modifier, at least one component selected from the group consisting of flame retardants, mold releases, antioxidants, stabilizers, fillers and mixtures thereof, and at least one weld line strength promoter, wherein the weld line strength promoter is selected from the group consisting of cyclohexylamine; 1-hexadecylamine; a triamine having the formula:

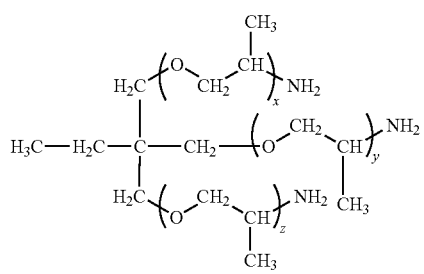

wherein the sum of x+y+z is from about 3 to about 20; N,N-diethylamine; N,N-dipropylamine; a polyethyleneimine having the formula:

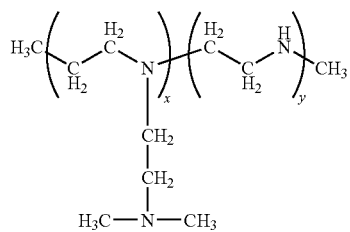

wherein "x" and "y" are integers each having a value from about 2 to about 15; a polyamine having a backbone of formula

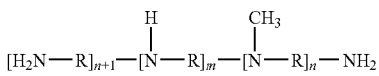

wherein R is $C_2$-$C_8$ alkylene, $C_3$-$C_8$ alkyl substituted alkylene, and mixtures thereof, wherein m is from 2 to about 700; n is from 0 to about 350; a polyamine having a backbone of the formula:

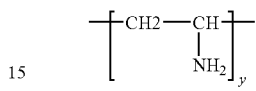

wherein y is from 5 to about 10,000; polyamine compounds wherein from 0% to 100% of the polyamine backbone NH units are substituted by one or more units having the formula:

$$-(R^1O)_xR^2$$

wherein $R^1$ is $C_2$-$C_6$ alkylene, $C_3$-$C_6$ alkyl substituted alkylene, and mixtures thereof; $R^2$ is hydrogen, $C_1$-$C_4$ alkyl, and mixtures thereof, and x is from 1 to 12 and y is from 5 to 5000; polyethyleneimine and combinations of two or more of the foregoing weld line strength promoters.

5. The resin composition of claim 1, wherein the weld line strength promoter is a polyethyleneimine.

6. The resin composition of claim 2, wherein the weld line strength promoter is a polyethyleneimine having the formula:

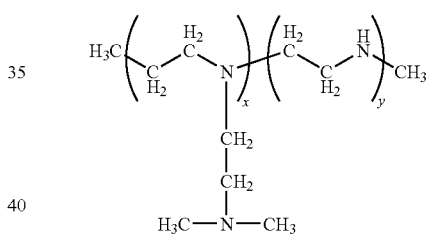

wherein "x" and "y" are integers each having a value from about 2 to about 15 and mixtures thereof.

7. The resin composition of claim 3, wherein the weld line strength promoter is a polyethyleneimine.

8. The resin composition of claim 4, wherein the weld line strength promoter is a polyethyleneimine.

* * * * *

UNITED STATES PATENT AND TRADEMARK OFFICE
CERTIFICATE OF CORRECTION

PATENT NO.      : 7,582,693 B2                                        Page 1 of 1
APPLICATION NO. : 10/421601
DATED           : September 1, 2009
INVENTOR(S)     : Kannan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 289 days.

Signed and Sealed this

Fourteenth Day of September, 2010

David J. Kappos
*Director of the United States Patent and Trademark Office*